UNITED STATES PATENT OFFICE.

HENRY SPENCER BLACKMORE, OF MOUNT VERNON, NEW YORK, ASSIGNOR TO THE PURE ALUMINIUM AND CHEMICAL COMPANY, OF WEST VIRGINIA.

PROCESS OF MAKING ALUMINIUM SULFID.

SPECIFICATION forming part of Letters Patent No. 605,378, dated June 7, 1898.

Application filed June 12, 1896. Renewed April 21, 1898. Serial No. 678,431. (No specimens.)

*To all whom it may concern:*

Be it known that I, HENRY SPENCER BLACKMORE, a citizen of the United States, and a resident of the city of Mount Vernon, in the county of Westchester and State of New York, have invented a new and useful Improvement in Processes of Producing Aluminium Sulfid, of which the following is a specification.

The object of my invention is to produce aluminium sulfid to be utilized for reduction to metallic aluminium or otherwise; and it consists in introducing into a molten bath carbon bisulfid, carrying alumina in fine state of subdivision or alumina containing absorbed or occluded carbon bisulfid. As the alumina and carbon bisulfid enter the molten bath the alumina in its fine state of subdivision becomes almost instantly heated to redness, when the absorbed or occluded carbon bisulfid expands and passes out of the pores of the porous alumina, and, coming in contact with the exterior heated surface of the particles of alumina, reacts with the same, producing aluminium sulfid and eliminating carbonic anhydrid and carbonyl sulfid, which, being gases, pass off out of the mass, while the sulfid produced is quickly dissolved in the molten bath. The reactions which take place may be illustrated by the following chemical formula or equations:

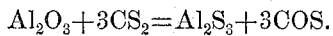

Should the carbon bisulfid at any time not be in excess and the temperature high, the following more complete reaction would take place:

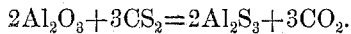

In carrying out my invention on a practical basis I employ a molten bath of cryolite containing a mixture of potassium and sodium chlorid, the latter of which causes the mixture to melt at a lower temperature than the cryolite ordinarily would. I then place carbon bisulfid in a receptacle and heat it by means of a steam coil, whereby the carbon bisulfid is volatilized or brought to a gaseous state. This is then conducted through heated pipes to the bottom of a receptacle containing alumina in a fine state of subdivision, which is also slightly heated, but not so high as to cause reaction. As the carbon bisulfid passes up through the fine alumina it is absorbed or occluded thereby, while the current of gaseous carbon bisulfid carries with it out of the receptacle a stream of fine suspended alumina. This current of carbon bisulfid, carrying the suspended alumina saturated with the same, is conveyed into the lower part of a carbon-lined retort containing the molten mixture of cryolite and potassium and sodium chlorids and is then by the action of the heat transformed into aluminium sulfid, which dissolves in the molten bath, and gaseous carbonic anhydrid and carbonyl sulfid, which pass off out of the apparatus.

I am aware that aluminium oxid has been converted into aluminium sulfid by heating the aluminium oxid to redness and passing the vapor of carbon bisulfid over the same while contained in a proper receptacle, at which time the solid particles of aluminium oxid become superficially coated with aluminium sulfid, being of more fusible nature, thereby preventing further action. By this operation the largest percentage of sulfid produced is about thirty-three per cent., the balance being unconverted aluminium oxid. There is also lost considerable of the aluminium oxid and sulfid produced by reason of its extreme lightness, owing to its being carried out of the apparatus while suspended in a current of gaseous by-products, such as carbonic anhydrid and carbonyl sulfid. In my process the aluminium oxid and carbon bisulfid are introduced into a retort simultaneously in the presence of a solvent molten bath, and this difficulty is thus obviated, as the particles of aluminium oxid containing absorbed or occluded carbon bisulfid are in condition to be immediately transformed into aluminium sulfid and its by-products when it comes in contact with the molten bath, which also dissolves the sulfid product, thus assuring a free fluid mass not clogged by the presence of semifusible sulfid requiring such a high temperature to melt. The bath also prevents loss by materials being carried off by suspension as they are caught and dissolved by the molten bath and prevented from escaping with the gaseous by-products. This aluminium sulfid dissolved in the molten bath is also in better condition for reduction than alumnium sulfid *per se*, for the reason that a much lower temperature is required, thus economizing fuel as well as wear and tear on retorts and apparatus, due to the excessively high temperature. Consequently it is not necessary to separate it from the bath for that purpose.

In conclusion I would state that I do not claim any process herein for separation of the aluminium sulfid produced from the molten bath in which it is dissolved, but merely the transformation of aluminium oxid and carbon bisulfid introduced simultaneously into a molten bath of salts or compounds which will dissolve but not react or change the products to be transformed or produced. It is therefore obvious that any molten bath of compounds having the solvent and otherwise inert properties stated may be employed; but I have found the mixture of cryolite and alkali chlorids herein stated to be the most preferable.

Having now described my invention, what I claim as new, and desire to claim and secure by Letters Patent, is—

1. The process for transforming aluminium oxid into aluminium sulfid which consists in simultaneously conveying into a chemically inert molten bath capable of dissolving aluminium sulfid, a mixture of aluminium oxid and carbon bisulfid substantially as described.

2. The process for transforming aluminium oxid into aluminium sulfid which consists in introducing simultaneously heated aluminium oxid and carbon bisulfid into a molten bath capable of dissolving the aluminium sulfid produced, without reacting or decomposing either the materials introduced or product produced, substantially as described.

3. The process for transforming aluminium oxid into aluminium sulfid which consists in blowing a heated mixture of aluminium oxid and carbon bisulfid into a retort containing a molten bath capable of dissolving the aluminium sulfid produced but not reacting or combining with or decomposing either the aluminium oxid or carbon bisulfid introduced or the aluminium sulfid produced substantially as described.

In testimony that I claim the foregoing as my invention I have signed my name, in presence of two witnesses, this 11th day of June, 1896.

HENRY SPENCER BLACKMORE. [L. S.]

Witnesses:
CHAS. A. SCHENCK,
ALBERT F. GESCHEIDT.